United States Patent [19]
de Molina

[11] Patent Number: 5,823,306
[45] Date of Patent: Oct. 20, 1998

[54] STROKE DEPENDENT DAMPING

[75] Inventor: Simon Anne de Molina, Merchtem, Belgium

[73] Assignee: Tenneco Automotive Inc., Lake Forest, Ill.

[21] Appl. No.: 746,388

[22] Filed: Nov. 12, 1996

[51] Int. Cl.[6] ....................................................... F16F 9/34
[52] U.S. Cl. .............................. 188/322.15; 188/322.22; 188/317; 188/282.5; 188/282.8; 188/320; 188/322.13
[58] Field of Search ......................... 188/322.15, 322.22, 188/320, 322.13, 317, 284, 280, 282.1–282.9, 283.1, 322.18, 282.4; 267/124, 125, 126, 127, 129; 137/512.15, 512.4, 512.1

[56] References Cited

U.S. PATENT DOCUMENTS

| | | |
|---|---|---|
| 1,164,371 | 12/1915 | Lovejoy . |
| 2,487,471 | 11/1949 | Patriquih . |
| 2,599,477 | 6/1952 | Patriquih . |
| 2,637,414 | 5/1953 | Patriquih . |
| 2,729,308 | 1/1956 | Koski et al. . |
| 2,907,414 | 10/1959 | Patriquih . |
| 3,236,339 | 2/1966 | Duckett . |
| 3,367,455 | 2/1968 | Panigati . |
| 3,828,897 | 8/1974 | Nandyal . |
| 4,121,704 | 10/1978 | Nicholls . |
| 4,230,309 | 10/1980 | Schnitzius . |
| 4,383,595 | 5/1983 | Schnitzius . |
| 4,632,228 | 12/1986 | Oster et al. . |
| 4,768,629 | 9/1988 | Wössner ............................... 188/322.22 |
| 4,775,038 | 10/1988 | Unnikrishnan et al. ................. 188/317 |
| 4,796,871 | 1/1989 | Bauer et al. . |
| 4,807,860 | 2/1989 | Simons . |
| 5,219,414 | 6/1993 | Yamaoka ............................. 188/322.15 |
| 5,325,943 | 7/1994 | Ralph . |
| 5,509,513 | 4/1996 | Kiesel . |

FOREIGN PATENT DOCUMENTS

| | | | |
|---|---|---|---|
| 472645 | 4/1951 | Canada .................................. 188/320 |
| 26255396 | 7/1989 | France . |
| 4427273 A1 | 2/1995 | Germany . |

Primary Examiner—Douglas C. Butler
Attorney, Agent, or Firm—Harness, Dickey & Pierce, PLC

[57] ABSTRACT

A two-stage shock absorber having a pressure tube within which a valve assembly is slidably disposed. A piston rod is attached to the valve assembly and extends out of the pressure tube. In a first embodiment, a ring which is slidably disposed within the pressure tube engages the valve assembly after a specified amount of movement of the valve assembly with respect to the pressure tube In both an extension and compression movement of the shock absorber. The engagement of the ring with the valve assembly reduces the fluid flow through the valve assembly to switch the shock absorber from soft damping to firm damping. In a second embodiment, the ring switches the shock absorber from soft damping to firm damping only during an extension movement.

21 Claims, 6 Drawing Sheets

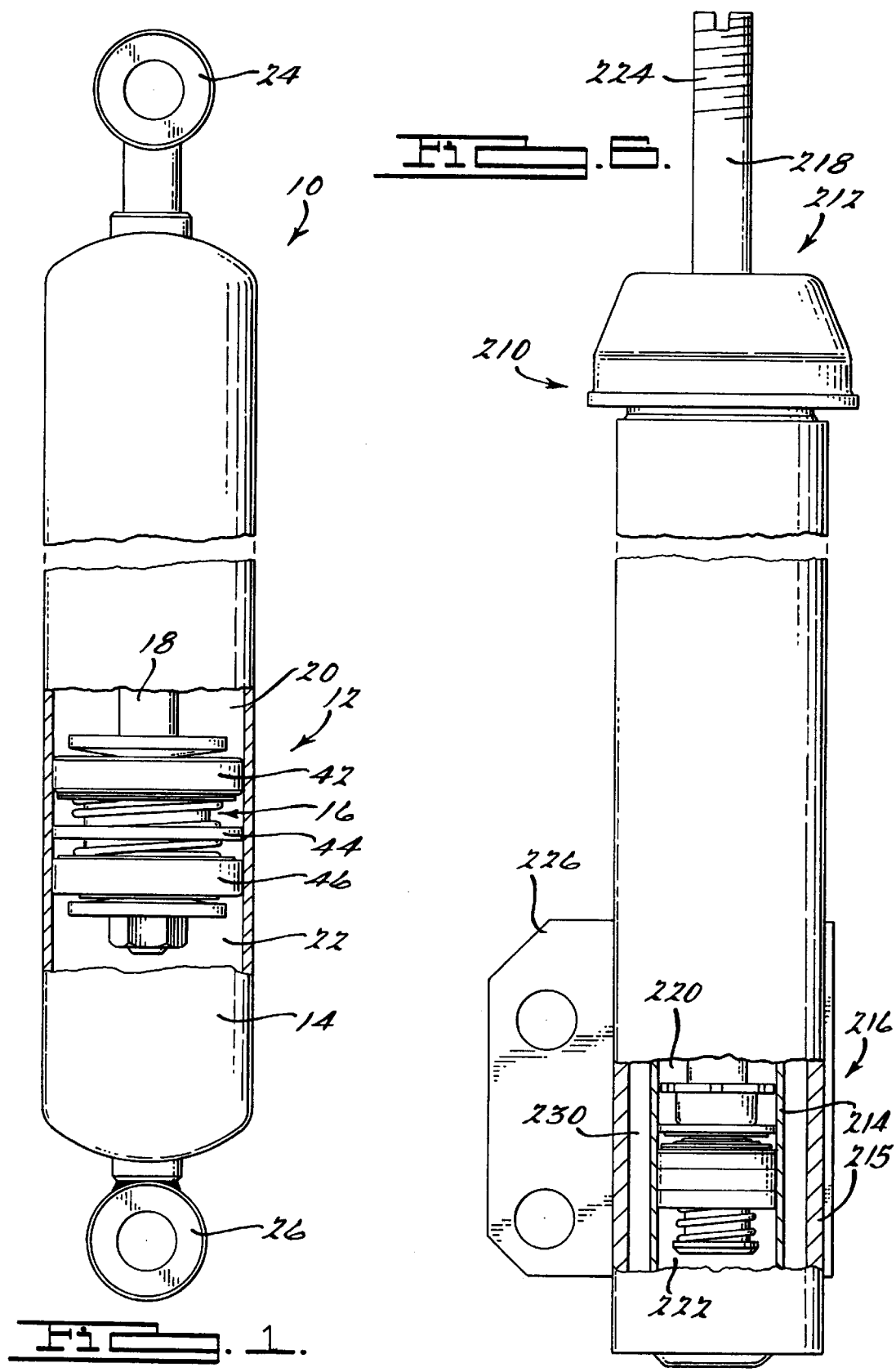

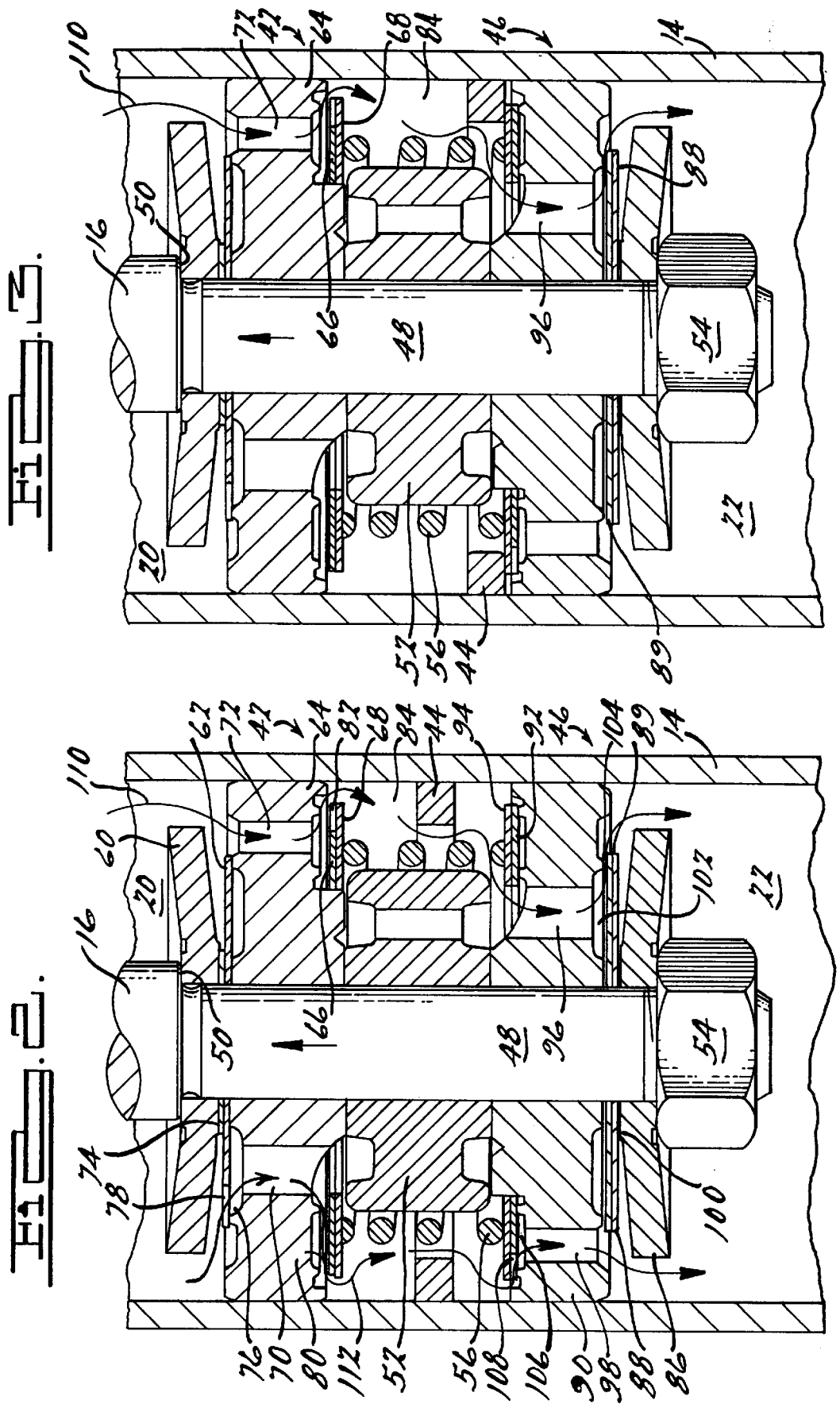

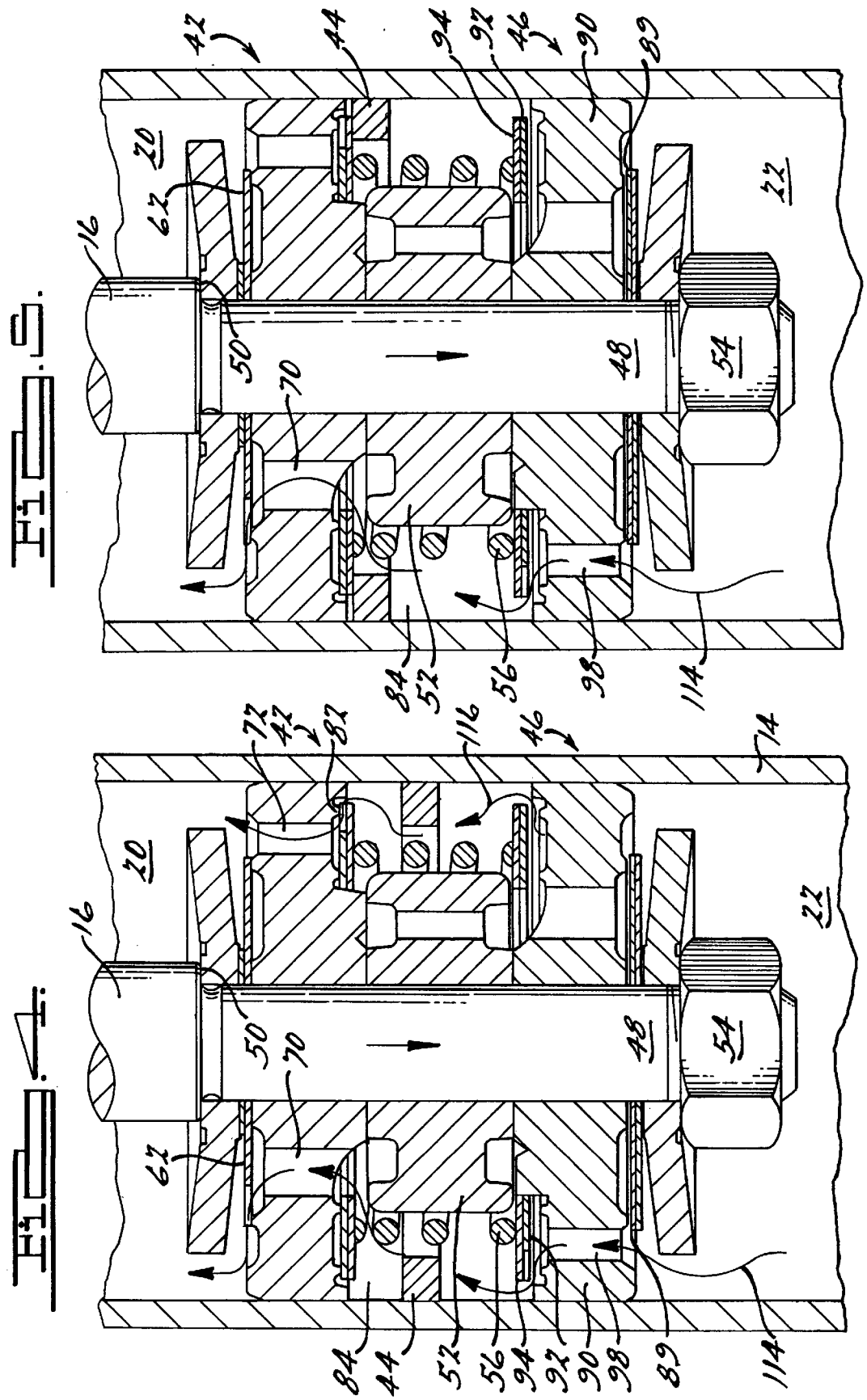

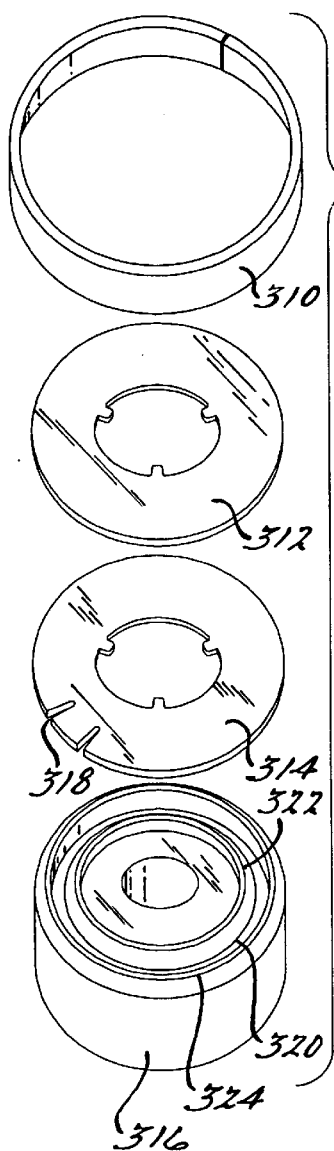
FIG. 11.
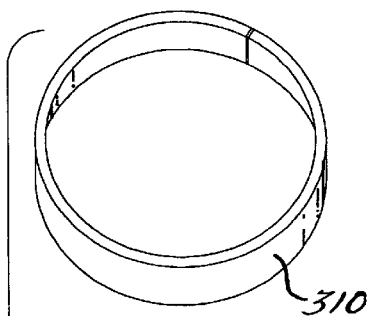
FIG. 13.
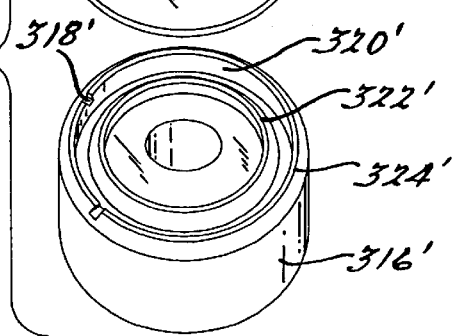
FIG. 12.
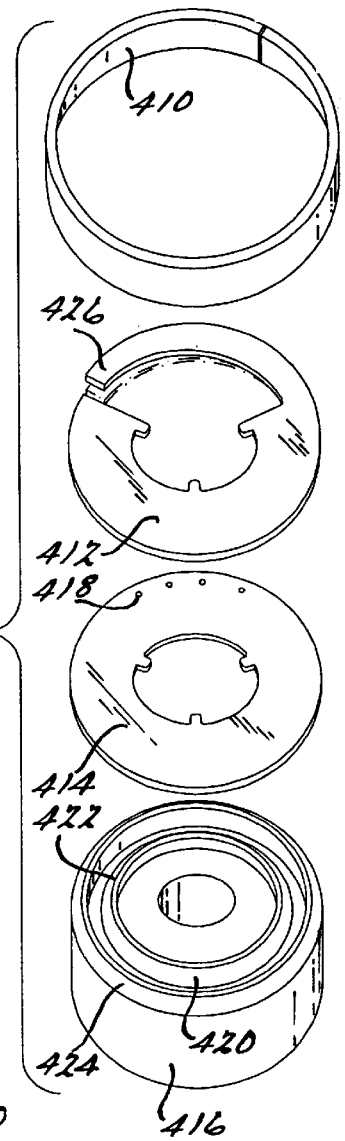

STROKE DEPENDENT DAMPING

FIELD OF THE INVENTION

The present invention relates to a hydraulic damper or shock absorber adapted for use in a suspension system such as the systems used for automotive vehicles. More particularly, the present invention relates to a hydraulic damper having a two-stage damping characteristic where a relatively low level damping is provided for small amplitudes of movement and a relatively high level of damping is provided for large amplitudes of movement.

BACKGROUND OF THE INVENTION

A conventional prior art hydraulic damper or shock absorber comprises a cylinder having a piston slidably disposed in the cylinder with the piston separating the interior of the cylinder into two liquid chambers. A piston rod is connected to the piston and extends out of one end of the cylinder. A valving system is incorporated for generating damping force during the extension stroke of the hydraulic damper and a second valving system is incorporated for generating damping force during the compression stroke of the hydraulic damper.

Various types of damping force generating devices have been developed to generate desired damping forces in relation to the speed and/or the displacement of the piston within the cylinder. These multi-force damping force generating devices have been developed to provide a relatively small or low damping force during the normal running of the vehicle and a relatively large or high damping force during maneuvers requiring extended suspension movements. The normal running of the vehicle is accompanied by small or fine vibrations of the un-sprung mass of the vehicle and thus the need for a soft ride or low damping characteristic of the suspension system to isolate the sprung mass from these vibrations. During a turning or braking maneuver, as an example, the sprung mass of the vehicle will attempt to undergo a relatively slow and/or large vibration which then requires a firm ride or high damping characteristics of the suspension system to support the sprung mass and provide stable handling characteristics to the vehicle. Thus, these multi-force damping force generating devices offer the advantage of a smooth steady state ride by eliminating the high frequency/small excitations from the sprung mass while still providing the necessary damping or firm ride for the suspension system during vehicle maneuvers causing larger excitations of the sprung mass.

The continued development of hydraulic dampers includes the development of multi-force damping force generating devices which are simpler to manufacture, can be manufactured at a lower cost and which provide the desired force generating characteristics.

SUMMARY OF THE INVENTION

The present invention provides the art with a two-stage hydraulic damper or shock absorber that provides damping which varies according to the stroke amplitude. Soft damping is provided for small strokes and firm damping is provided for large strokes. The variable damping is provided by a floating ring that is frictionally held in place in the pressure cylinder. When the shock absorber undergoes a small stroke, the floating ring remains inactive and the fluid flows through two separate flow paths to provide a soft damping. When the shock absorber undergoes a large stroke, the floating ring moves to close off one of the two flow paths which in turn provides a firm damping.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is a cross-sectional side view of a monotube shock absorber incorporating the multi-force damping force generating device in accordance with the present invention;

FIG. 2 is an enlarged cross-sectional side view illustrating the piston assembly of the shock absorber shown in FIG. 1 during a small extension stroke of the shock absorber;

FIG. 3 is an enlarged cross-sectional side view illustrating the piston assembly of the shock absorber shown in FIG. 1 during a large extension stroke of the shock absorber;

FIG. 4 is an enlarged cross-sectional side view illustrating the piston assembly of the shock absorber shown in FIG. 1 during a small compression stroke of the shock absorber;

FIG. 5 is an enlarged cross-sectional side view illustrating the piston assembly of the shock absorber shown in FIG. 1 during a large compression stroke of the shock absorber;

FIG. 6 is a cross-sectional side view of a dual tube shock absorber incorporating the multi-force damping force generating device in accordance with the present invention;

FIG. 11 is an exploded view of the valve body, bleed discs and floating ring in accordance with the present invention;

FIG. 12 is an exploded view of the valve body, bleed discs and floating ring in accordance with another embodiment of the present invention; and FIG. 13 is an exploded view of the valve body, bleed discs and floating ring in accordance with another embodiment of the present invention.

DETAILED DESCRIPTION OF THE PREFERRED EMBODIMENT

Figure 7:
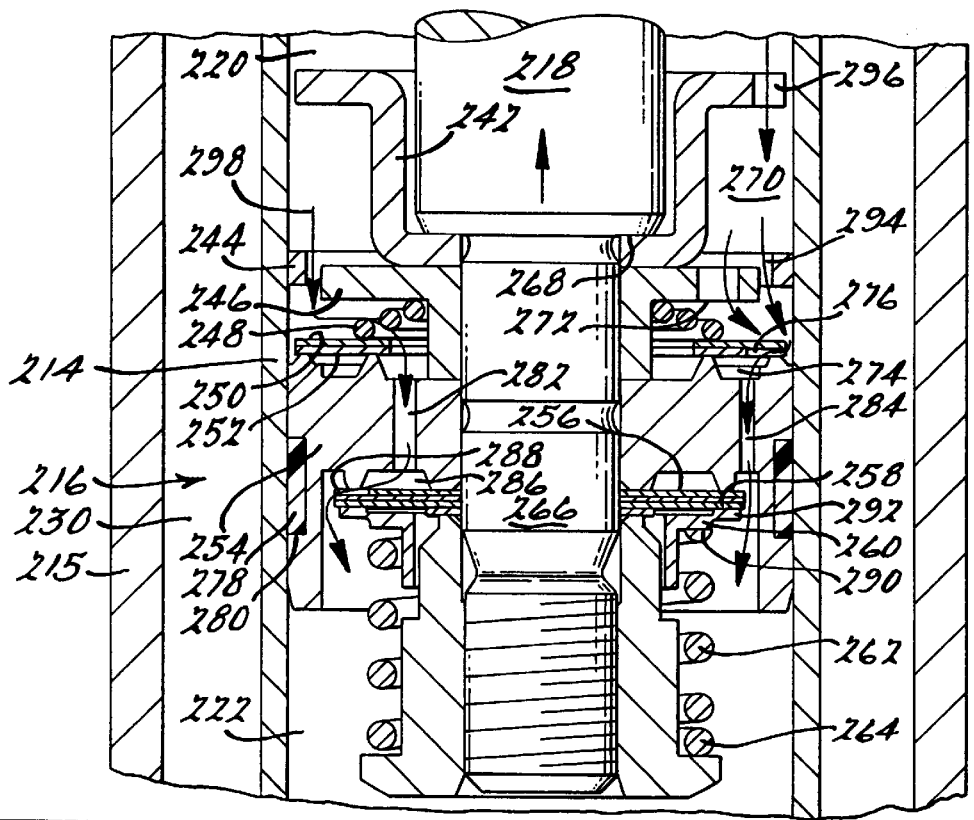
FIG. 7 is an enlarged cross-sectional side view illustrating the piston assembly of the shock absorber shown in FIG. 6 during a small extension stroke of the shock absorber.

Referring now to the drawings in which like reference numerals designate like or corresponding parts throughout the several views, there is shown in FIG. 1 a two-stage monotube shock absorber which incorporates the multi-force damping force generating device in accordance with the present invention and which is designated generally by the reference numeral 10. Shock absorber 10 is a monotube design and comprises a piston rod assembly 12 and a pressure tube 14. Piston rod assembly 12 includes a piston valve assembly 16 and a piston rod 18. Valve assembly 16 divides pressure tube 14 into an upper working chamber 20 and a lower working chamber 22. Piston rod 18 extends out of pressure tube 14 and includes a fitting 24 for attachment to one of the sprung or unsprung mass of the vehicle. Pressure tube 14 is filled with fluid and includes a fitting 26 for attachment to the other of the sprung or unsprung masses of the vehicle. Thus, suspension movements of the vehicle will cause extension or compression movement of piston rod assembly 12 with respect to pressure tube 14 and these movements will be dampened due to the restricted fluid flow between chambers 20 and 22 through valve assembly 16.

Valve assembly 16 is attached to piston rod 18 and comprises an upper valve assembly 42, a floating ring 44 and a lower valve assembly 46. Referring now to FIGS. 2 and 3, piston rod 18 includes a reduced diameter section 48 located on the end of piston rod 18 disposed within pressure tube 14 to form a shoulder 50 for mounting the remaining components of valve assembly 16. Upper valve assembly 42 is positioned adjacent shoulder 50. A valve spacer 52 is positioned adjacent to upper valve assembly 42 and lower valve assembly 46 is positioned adjacent to spacer 52. A nut 54 is threadingly received on the end of piston rod 18 to maintain the assembly of the components. A coil spring 56 is disposed between upper valve assembly 42 and lower valve assembly 46 to control the opening and closing of these assemblies. Floating ring 44 is also disposed between upper valve assembly 42 and lower valve assembly 46 to activate the multi-force damping force generating device according to the present invention. When assembled into pressure tube 14, upper valve assembly 42, and lower valve assembly 46 are slidingly and sealingly received within pressure tube 14 such that movement of piston rod 18 with respect to pressure tube 14 cause fluid movement through upper and lower valve assemblies 42 and 46 but fluid does not flow between the valve assemblies and pressure tube 14. Floating ring 44 is also slidingly and sealingly received within pressure tube 14 between upper and lower valve assemblies 42 and 46. Floating ring 44 operates with both upper and lower valve assemblies 42 and 46 to control the damping rate for shock absorber 10.

Upper valve assembly 42 comprises a valve plate stop 60, an exhaust valve plate 62, a valve body 64, a soft bleed disc 66 in combination with intake valve disc 68. Valve body 64 defines a first passageway 70 and a second passageway 72 for allowing fluid flow through valve body 64 when piston rod assembly 12 moves with respect to pressure tube 14. Exhaust valve plate 62 controls the amount of fluid flow through passageway 70 and soft bleed disc 66 in combination with intake valve disc 68 control the amount of fluid flow through passageway 72. Valve plate stop 60 is positioned adjacent to shoulder 50 and exhaust valve plate 62 is spaced from stop 60 by a washer 74. Exhaust valve plate 62 abuts valve body 64 and closes an annular cavity 76 located in the upper portion of valve body 64. Exhaust valve plate 62 defines at least one opening 78 through which the fluid flowing through passageway 70 in valve body 64 flows during the stroke of shock absorber 10. Exhaust valve plate 62 can also deflect upwards due to fluid pressure during the compression stroke. The upward deflection of plate 62 is limited by stop 60. Soft bleed disc 66 and intake valve disc 68 are located on the opposite side of valve body 64 from exhaust valve plate 62. Such bleed disc 66 is disposed adjacent to valve body 64 and both disc 66 and disc 68 are biased towards valve body 64 by coil spring 56. Soft bleed disc 66 abuts valve body 64 and closes an annular cavity 80 located in the lower portion of valve body 64. Soft bleed disc 66 defines at least one opening 82 through which the fluid flowing through passageway 72 in valve body 64 flows during the stroke of shock absorber 10. Soft bleed disc 66 and intake valve disc 68 can also move to an unseated position in relation to valve body 64 due to the deflection of spring 56 caused by fluid pressure during the extension stroke of shock absorber 10.

Lower valve assembly 46 is similar to upper valve assembly 42 but operates in a directionally opposite manner. Lower valve assembly 46 is attached to the lower end of piston rod 18 and is spaced from upper valve assembly 42 by spacer 52. This spacing defines an intermediate chamber 84 within which coil spring 56 is disposed and within which floating ring 44 operates. Lower valve assembly 46 comprises a valve plate stop 86, an exhaust valve plate 88, an exhaust soft bleed disc 89, a valve body 90, a soft bleed disc 92 and an intake valve disc 94. Valve body 90 defines a first passageway 96 and a second passageway 98 for allowing fluid flow through valve body 90 when piston rod assembly 12 moves with respect to pressure tube 14. Exhaust valve plate 88 in combination with exhaust soft bleed disc 89 control the amount of fluid flow through passageway 96 and soft bleed disc 92 in combination with intake valve disc 94 controls the amount of fluid flow through passageway 98. Valve plate stop 86 is positioned adjacent to nut 54 and exhaust valve plate 88 is spaced from stop 86 by a washer 100. Exhaust valve plate 88 abuts exhaust soft bleed disc 89 which abuts valve body 90 and closes an annular cavity 102 located in the lower portion of valve body 90. Exhaust soft bleed disc 89 defines at least one opening 104 through which the fluid flowing through passageway 96 in valve body 90 flows during the stroke of shock absorber 10. Exhaust valve plate 88 can also deflect downwards due to fluid pressure during the extension stroke of shock absorber 10. The downward deflection of plate 88 is limited by stop 86. Soft bleed disc 92 and Intake valve disc 94 are located on the opposite side of valve body 90 from exhaust valve plate 88. Soft bleed disc 92 is disposed adjacent to valve body 90 and both disc 92 and disc 94 are biased towards valve body 90 by coil spring 56. Soft bleed disc 92 abuts valve body 90 and closes an annular cavity 106 located in the upper portion of valve body 90. Soft bleed disc 92 defines at least one opening 108 through which the fluid flowing through passageway 98 in valve body 90 flows during the stroke of shock absorber 10. Soft bleed disc 92 and intake valve disc 94 can also move to an unseated position in relation to valve body 90 due to the deflection of spring 56 caused by fluid pressure during the compression stroke of shock absorber 10.

FIGS. 2 through 5 illustrate the various damping characteristics provided for by piston rod assembly 12 of shock absorber 10. FIG. 2 illustrates a small amplitude extension, FIG. 3 illustrates a large amplitude extension, FIG. 4 illustrates a small amplitude compression and FIG. 5 illustrates a large amplitude compression for shock absorber 10.

A small amplitude extension of shock absorber 10 is illustrated in FIG. 2 with arrows depicting the fluid flow. During small amplitudes of extension, floating ring 44 remains in place within intermediate chamber 84 due to the friction with pressure tube 14 and does not contact upper valve assembly 42 or lower valve assembly 46. Fluid flow from upper chamber 20 of pressure tube 14 through intermediate chamber 84 and into lower chamber 22 of pressure tube 14 occurs through two parallel paths. The first path is numbered 110 and extends from upper chamber 20 of pressure tube 14 through passageway 72 unseating soft bleed disc 66 and intake valve disc 68 from valve body 64 to enter intermediate chamber 84. The fluid flow continues from chamber 84 through passageway 96 and past exhaust valve plate 88 of lower valve assembly 46 to enter lower chamber 22 of pressure tube 14. Simultaneously, fluid flows through a second flow path 112 as depicted by the arrows. Fluid flow leaves intermediate chamber 84 through opening 108 in soft bleed disc 92 and through passageway 98 to also enter lower chamber 22 of pressure tube 14. These dual parallel flow paths 110 and 112, will thus provide a relatively soft ride for small movements of shock absorber 10.

A large amplitude extension of shock absorber 10 is illustrated in FIG. 3 with arrows depicting fluid flow. During large amplitudes of extension, floating ring 44 remains in position due to friction and lower valve assembly 46 moves with piston rod 16 to contact floating ring 44. Fluid flow from upper chamber 20 of pressure tube 14 through intermediate chamber 84 and into lower chamber 22 of pressure tube 14 occurs through only one path which is path 110. As stated above, path 110 extends from upper chamber 20 of pressure tube 14 through passageway 72 unseating soft bleed disc 66 and intake valve disc 68 from valve body 64 to enter intermediate chamber 84. The fluid flow continues from chamber 84 through passageway 96 and past exhaust valve plate 88 of lower valve assembly 46 to enter lower chamber 22 of pressure tube 14. Flow path 112, shown in FIG. 2, is blocked due to the position of floating ring 44. The single flow path will thus provide a relatively firm ride for large movements of shock absorber 10.

A small amplitude compression of shock absorber 10 is illustrated in FIG. 4 with arrows depicting the fluid flow. During small amplitudes of compression, floating ring 44 remains in place within intermediate chamber 84 due to the friction with pressure tube 14 and does not contact upper valve assembly 42 or lower valve assembly 46. Fluid flow from lower chamber 22 of pressure tube 14 through intermediate chamber 84 and into upper chamber 20 of pressure tube 14 occurs through two parallel paths. The first path is numbered 114 and extends from lower chamber 22 of pressure tube 14 through passageway 98 unseating soft bleed disc 92 and intake valve disc 94 from valve body 90 to enter intermediate chamber 84. The fluid flow continues from chamber 84 through passageway 70 and past exhaust valve plate 62 of upper valve assembly 42 to enter upper chamber 20 of pressure tube 14. Simultaneously, fluid flow through a second flow path 116 as depicted by the arrows. Fluid flow leaves lower chamber 22 through opening 104 and through passageway 96 to enter intermediate chamber 84. Fluid flow leaves intermediate chamber 84 through opening 82 in soft bleed disc 66 and through passageway 72 to also enter upper chamber 20 of pressure tube 14. These dual parallel flow paths 114 and 116 will thus provide a relatively soft ride for small movements of shock absorber 10.

A large amplitude compression of shock absorber 10 is illustrated in FIG. 5 with arrows depicting fluid flow. During large amplitudes of compression, floating ring 44 remains in position due to friction and upper valve assembly 42 moves with piston rod 18 to contact floating ring 44. Fluid flow from the lower chamber 22 of pressure tube 14 through intermediate chamber 84 and into upper chamber 20 of pressure tube 14 occurs through only one path which is path 114. As stated above, path 114 extends from lower chamber 22 of pressure tube 14 through passageway 98 unseating soft bleed disc 92 and intake valve disc 94 from valve body 90 to enter intermediate chamber 84. The fluid flow continues from chamber 84 through passageway 70 and past exhaust valve plate 62 of upper valve assembly 42 to enter upper chamber 20 of pressure tube 14. Flow path 116 shown in FIG. 4 is blocked due to the position of floating ring 44. The single flow path will thus provide a relatively firm ride for large movements of shock absorber 10.

FIGS. 6 through 10 illustrate a two-stage dual tube shock absorber which incorporates the multi-force damping force generating device in accordance with the present invention which is indicated generally by the reference numeral 210. Shock absorber 210 is a dual tube design and comprises a piston rod assembly 212, a pressure tube 214, and a reserve tube 215. Piston rod assembly 212 includes a valve assembly 216 and a piston rod 218. Valve assembly 216 divides pressure tube 214 into an upper working chamber 220 and a lower working chamber 222. Piston rod 218 extends out of pressure tube 214 and reserve tube 215 and includes a threaded portion 224 for attachment to one of the sprung or unsprung mass of the vehicle. Pressure tube 214 is filled with fluid which moves between chambers 220 and 222 through valve assembly 216 during movement of valve assembly 216. Reserve tube 215 surrounds pressure tube 214 and includes a fitting 226 for attachment to the other of the sprung or unsprung mass of the vehicle. Thus, suspension movements of the vehicle will cause extension or compression movement of piston rod assembly 212 with respect to pressure tube 214 and these movements will be damped due to the restricted fluid flow between chambers 220 and 222 through valve assembly 216. The difference in the volumes between chambers 220 and 222 during stroking of shock absorber 210 is known as "rod volume" and it is compensated for by a base valve (not shown) positioned at the bottom of shock absorber 10. The base valve controls the flow between lower chamber 222 and a reserve chamber 230 located between pressure tube 214 and reserve tube 215 as is well known in the art.

Valve assembly 216 is attached to piston rod 218 and comprises a cup-shaped housing 242, a floating ring 244, an upper spring retainer 246, an upper coil spring 248, an upper Intake valve disk 250, an upper soft bleed disk 252, a valve body 254, a lower soft bleed disc 256, a lower intake valve disc 258, a lower spring retainer 260, a lower coil spring 262 and a nut 264. Piston rod 218 defines a reduced diameter section 266 which defines a shoulder 268 which locates the components of valve assembly 216. Cup-shaped housing 242 is disposed adjacent to shoulder 268 and with valve body 254 defines an intermediate chamber 270 within pressure tube 214. Upper spring retainer 246 is disposed between housing 242 and valve body 254 and provides a shoulder 272 against which upper coil spring 248 can react. Upper coil spring 248 is disposed between upper spring retainer and valve body 254 to bias both upper intake valve disc 250 and upper soft bleed disc 252 towards valve body 254. Upper intake valve disc 250 and upper bleed disc 252 are disposed between upper coil spring 248 and valve body 254 and are biased against valve body 254 to close an annular cavity 274 defined in the upper portion of valve body 254. Upper soft bleed disc 252 defines at least one opening 276 which allows for the fluid flow of shock absorber 210.

Valve body 254 is disposed adjacent to upper spring retainer 246 and slidingly and sealingly engages pressure tube 214. A seal 278 is disposed within an annular groove 280 to provide the sealing relationship between valve body 254 and pressure tube 214. Valve body 254 defines a first passageway 282 and a second passageway 284 for allowing fluid flow through valve body 254 when piston rod assembly 212 moves with respect to pressure tube 214. Floating ring 244 slidably and sealingly engages pressure tube 214 and is disposed within intermediate chamber 270 between valve body 254 and housing 242.

Lower soft bleed disc 256 and lower intake valve disc 258 are disposed adjacent to the lower end of valve body 254 and are biased against valve body 254 by lower coil spring 262 to close an annular cavity 286 defined by the lower portion of valve body 254. Lower soft bleed disc 256 defines at least one opening 288 which allows for the fluid flow of shock absorber 10. Lower spring retainer 260 is located adjacent to lower Intake valve disc 258 and provides a shoulder 290 against which lower coil spring 262 can react, as well as providing a shoulder 292 which properly locates the biasing force of coil spring 262. Lower coil spring 262 is disposed between and reacts against lower spring retainer 260 and nut 264 to bias lower soft bleed disc 256 and lower intake valve disc 258 against valve body 254. Nut 264 is threadingly received on the free end of piston rod 218 and operates to position and retain the various elements of valve assembly 216 as well as preloading both upper coil spring 248 and lower coil spring 262.

Figure 8:
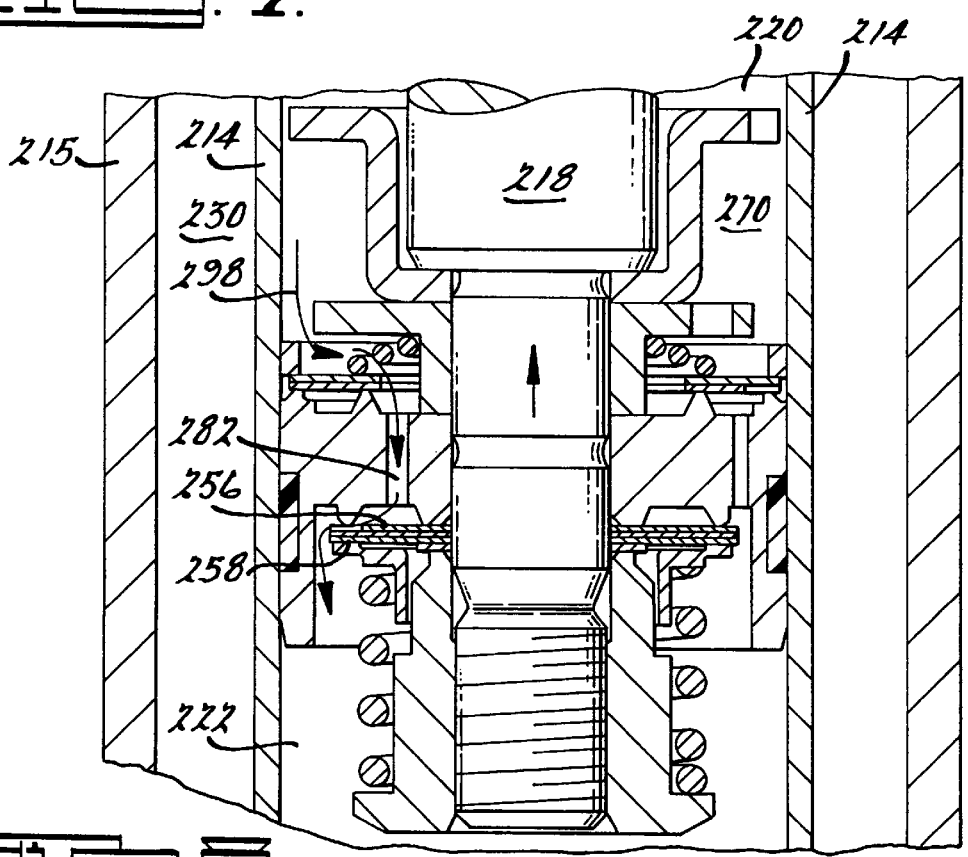
FIG. 8 is an enlarged cross-sectional side view Illustrating the piston assembly of the shock absorber shown in FIG. 6 during a large extension stroke of the shock absorber.
Figure 9:
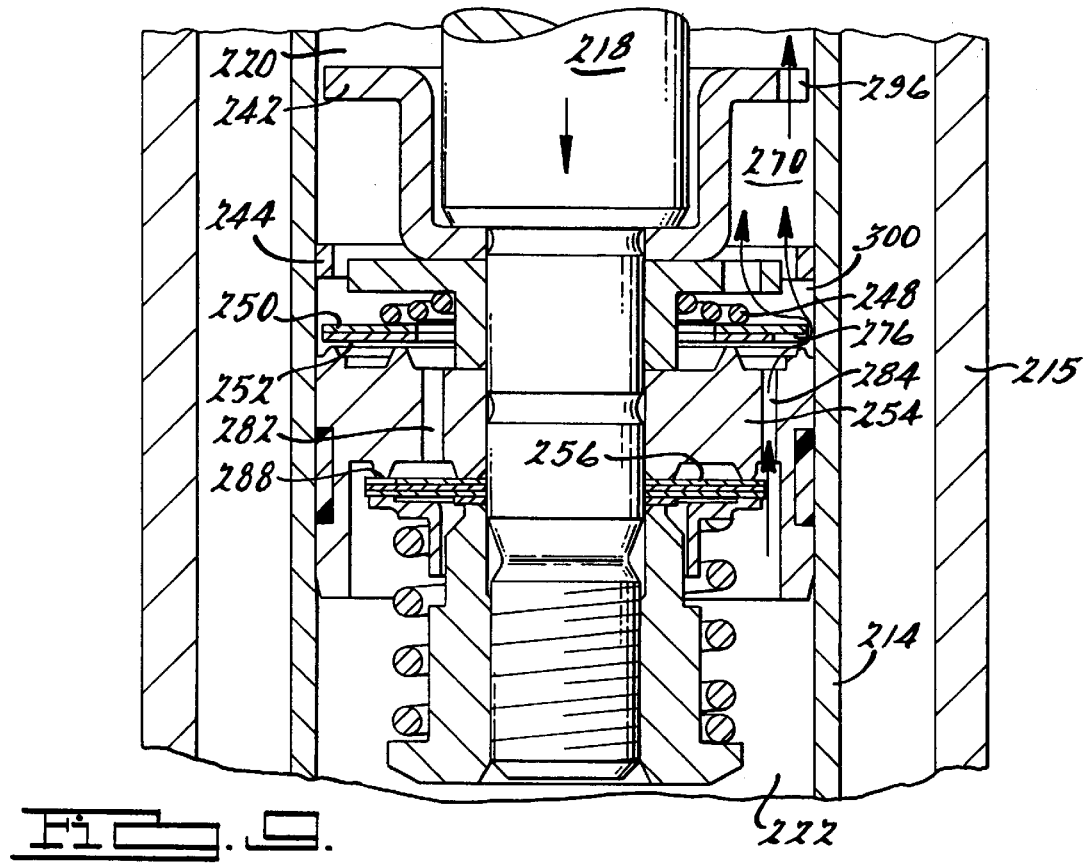
FIG. 9 is an enlarged cross-sectional side view illustrating the piston assembly of the shock absorber shown in FIG. 6 during a small compression stroke of the shock absorber.
Figure 10:
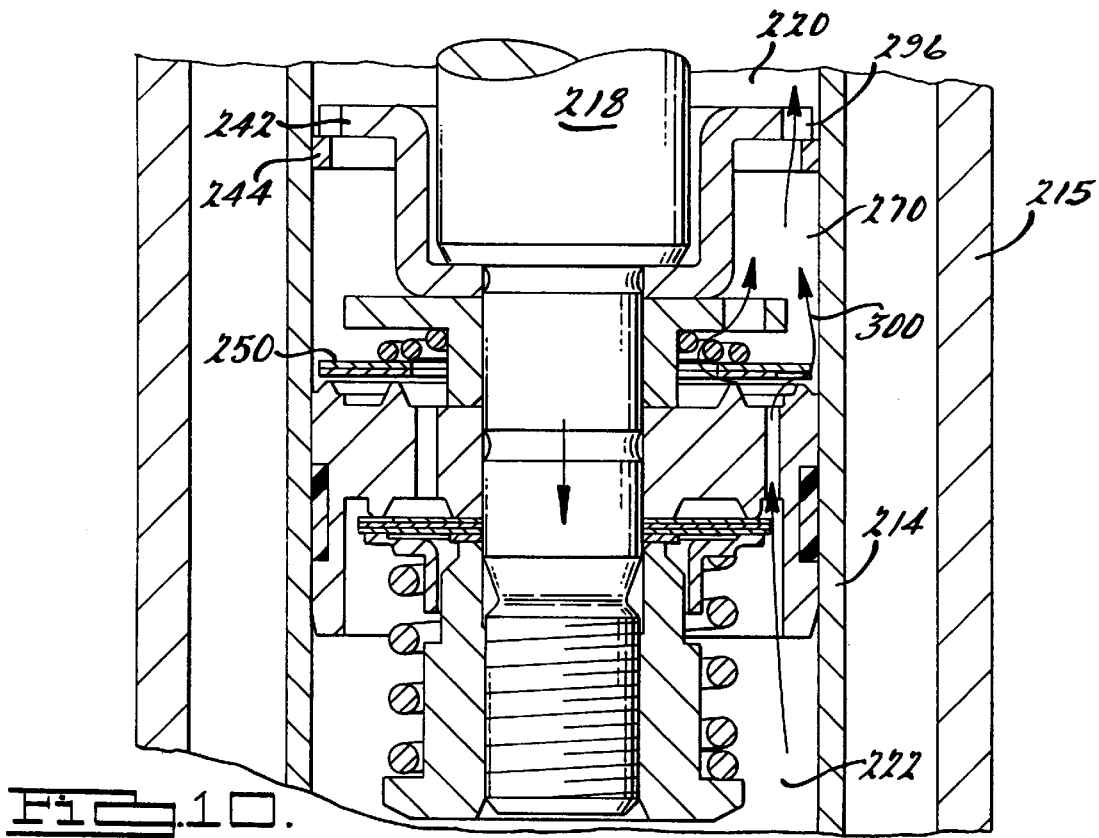
FIG. 10 is an enlarged cross-sectional side view illustrating the piston assembly of the shock absorber shown in FIG. 6 during a large compression stroke of the shock absorber.

FIGS. 7 through 10 illustrate the various damping characteristics provided for by piston and assembly 212 of shock absorber 210. FIG. 7 illustrates a small amplitude extension, FIG. 8 illustrates a large amplitude extension, FIG. 9 illustrates a small amplitude compression and FIG. 10 illustrates a large amplitude compression for shock absorber 210.

A small amplitude extension of shock absorber 210 is illustrated in FIG. 7 with arrows depicting the fluid flow. During small amplitudes of extension, floating ring 244 remains in place within intermediate chamber 270 due to the friction with pressure tube 214 and does not contact housing 242 or upper intake valve disc 250. Fluid flow from upper chamber 220 of pressure tube 214 through intermediate chamber 270 and into lower chamber 222 of pressure tube 214 occurs through two parallel paths. The first path is numbered 294 and extends from the upper chamber of pressure tube 14 through a passageway 296 formed into housing 242 to enter intermediate chamber 270. The fluid flow continues from chamber 270 through opening 276 in upper soft bleed disc 252 through passageway 284 in valve body 254 and enters lower chamber 222 of pressure tube 214. Simultaneously, fluid flows through a second flow path 298 as depicted by the arrows. Fluid flow enters intermediate chamber 270 around housing 242 and leaves intermediate chamber 270 through passageway 282 in valve body 254 and through opening 288 in lower soft bleed disc 256 to also enter lower chamber 222 of pressure tube 214. These dual parallel flow paths 294 and 298 will thus provide a relatively soft ride for small movements of shock absorber 210.

A large amplitude extension of shock absorber 210 is illustrated in FIG. 8 with arrows depicting fluid flow. During large amplitudes of extension, floating ring 244 remains in position due to friction and valve body 254 moves with piston rod 218 such that upper intake valve disc 250 contacts floating ring 244. Fluid flow from upper chamber 220 of pressure tube 214 through intermediate chamber 270 and into lower chamber 222 of pressure tube 214 occurs through only one path which is path 298. As stated above, path 298 extends from upper chamber 220 of pressure tube 214 around housing 242 to enter intermediate chamber 270. The fluid flow continues from chamber 270 through passageway 282 and past lower soft bleed disc 256 and lower intake valve disc 258 to enter lower chamber 222 of pressure tube 214. The fluid path 294 shown in FIG. 7 is blocked due to the position of floating ring 244. The single flow path will thus provide a relatively firm ride for large movements of shock absorber 210.

A small amplitude compression of shock absorber 210 is illustrated in FIG. 9 with the arrows depicting the fluid flow. During small amplitudes of compression, floating ring 244 remains In place within intermediate chamber 270 due to the friction with pressure tube 214 and does not contact housing 242 or upper intake valve disc 250. Fluid flow from lower chamber 222 of pressure tube 214 through intermediate chamber 270 and into upper chamber 220 of pressure tube 214 occurs primarily through one fluid path 300. Fluid path 300 extends from lower chamber 222 of pressure tube 14 through passageway 284 through opening 276 in upper soft bleed disc 252 and into intermediate chamber 270. The fluid leaves intermediate chamber 270 through passageway 296 in housing 242. The size of passageway 284 and the load exerted by upper coil spring 248 will provide the required damping for small movements of shock absorber 210.

A large amplitude compression of shock absorber 210 is illustrated in FIG. 10 with arrows depicting fluid flow. During large amplitudes of compression, floating ring 244 remains in position due to friction and housing 242 moves with piston rod 218 such that housing 242 contacts floating ring 244. The movement of housing 242 into engagement with floating ring 244 does not significantly reduce the size of passageway 296 and therefore it has no effect on the damping rate of shock absorber 210. At large amplitudes of compression which occur at high velocity, it is not desired to limit the damping of shock absorber 210. Thus, in compression, the damping rate for shock absorber 210 is substantially the same for both large and small amplitudes of movement.

All of the embodiments shown in FIGS. 1 through 10 illustrate an opening which is formed within a soft bleed disc. This Is illustrated in FIG. 11 where a floating ring 310, an intake valve disc 312, a soft bleed valve disc 314 and a valve body 316 are illustrated. Soft bleed valve disc 314 includes at least one opening 318 which provides the soft bleed characteristics for the shock absorber. Valve body 316 defines an annular chamber 320 which is formed by an inner annular ridge 322 and an outer annular ridge 324. Thus, when soft bleed valve disc 314 seats against valve body 316 and intake valve disc 312 seats against soft bleed valve disc 314, fluid flow into and out of chamber 320 is permitted through opening 318 in soft bleed valve disc 314. This type of an arrangement is typical for all of the soft bleed capabilities shown in FIGS. 1 through 10.

FIG. 12 illustrates a design which eliminates the need for soft bleed valve disc 314. There is illustrated in FIG. 12, floating ring 310, intake valve disc 312 and a valve body 316'. Valve body 316' defines an annular chamber 320' which is formed by an inner annular ridge 322' and an outer annular ridge 324'. Outer annular ridge 324' includes at least one opening 318' which provides the soft bleed characteristics for the shock absorber. Thus, when intake valve disc 312 seats against valve body 316', fluid flow into and out of chamber 320' is permitted through opening 318' in outer annular ridge 324'.

The two embodiments in FIGS. 11 and 12 illustrate a system which switches from soft damping to firm damping rapidly or similar to an on-off situation. FIG. 13 illustrates a system for switching from soft damping to firm damping in a gradual or continuously variable manner. FIG. 13 illustrates a floating ring 410, an intake valve disc 412, a soft bleed valve disc 414 and a valve body 416. Soft bleed valve disc 414 includes a plurality of openings 418 which provide the soft bleed characteristics for the shock absorber. Valve body 416 defines an annular cavity 420 which is formed by an inner annular ridge 422 and an outer annular ridge 424. Intake valve disc 412 is not a continuous disc as is intake valve disc 312. Instead, intake valve disc 412 is a split disc having one end formed outwardly to form an angular arm 426. Thus, when soft bleed valve disc 414 seats against valve body 416 and intake valve disc 412 seats against soft bleed valve disc 414, fluid flow into and out of cavity 420 is permitted through openings 418 in soft bleed valve disc 414. During the switch from a soft ride to a firm ride, the change is done progressively due to the movement of arm 426 which progressively closes and blocks each of the plurality of openings 418 as shown in the dashed lines. This progressive or continuously variable closing is in contrast to the on-off closing of the soft bleed characteristics described in the previous embodiments. It should be understood that the continuously variably soft bleed system shown in FIG. 13 can be placed within shock absorber 10 or shock absorber 210 whenever soft bleed characteristics are required.

While the above detailed description describes the preferred embodiment of the present invention, it should be understood that the present invention is susceptible to modification, variation and alteration without deviating from the scope and fair meaning of the subjoined claims.

What is claimed is:

1. A two-state shock absorber comprising:

a pressure tube;

a piston rod slidably disposed within said pressure tube;

a valve assembly attached to said piston rod and slidably disposed within said pressure tube, said valve assembly providing a first and a second fluid flow path during movement of said valve assembly within said pressure tube, said first and second flow paths of said valve assembly providing a low resistance to the movement of said valve assembly; and an independent ring disposed within said pressure tube, said valve assembly being movable between a first position spaced from said independent ring and a second position engaging said independent ring to close one of said first and second flow paths when movement of said valve assembly exceeds a specified distance, said closing of one of said first and second flow path providing a high resistance to the movement of said valve assembly, said valve assembly normally being located in said first position.

2. The two-stage shock absorber according to claim 1 wherein said valve assembly comprises a lower valve assembly slidably disposed within said pressure tube, said lower valve assembly providing a first and a second fluid passageway during movement of said valve assembly within said pressure tube, said lower valve assembly engaging said independent ring to close one of said first and second passageways of said lower valve assembly when said valve assembly moves said specified distance in a first direction to provide said high resistance to the movement of said valve assembly.

3. The two-stage shock absorber according to claim 2 wherein said valve assembly further comprises an upper valve assembly slidably disposed within said pressure tube, said upper valve assembly providing a first and a second passageway during movement of said valve assembly within said pressure tube, said upper valve assembly engaging said independent ring to close one of said first and second passageways of said upper valve assembly when said valve assembly moves said specified distance in a second direction to provide said high resistance to the movement of said valve assembly.

4. The two-stage shock absorber according to claim 3 wherein the change from said low resistance to said high resistance occurs in a continuously variable manner.

5. The two-stage shock absorber according to claim 2 wherein the change from said low resistance to said high resistance occurs in a continuously variable manner.

6. The two-stage shock absorber according to claim 2 wherein said valve assembly further comprises a housing which cooperates with said pressure tube to provide a single passageway, said housing engaging said independent ring when said valve assembly moves said specified distance in a second direction.

7. The two-stage shock absorber according to claim 1 wherein the change from said low resistance to said high resistance occurs in a continuously variable manner.

8. A two-stage shock absorber comprising:

a pressure tube;

a valve assembly slidably disposed within said pressure tube, said valve assembly dividing said cylinder into two liquid chambers;

a first flow path extending through said valve assembly, said first flow path fluidically connecting said two liquid chambers during both extension and compression strokes of said shock absorber;

a second flow path extending through said valve assembly, said second flow path fluidically connecting said two liquid chambers during both extension and compression strokes of said shock absorber;

a piston rod extending through one of said liquid chambers and projecting out of said pressure tube, said piston rod being connected to said valve assembly;

an independent ring slidably disposed within said pressure tube, said valve assembly being movable between a first position spaced from said independent ring and a second position engaging said independent ring to close one of said first and second flow paths when movement of said valve assembly with respect to said pressure tube exceeds a specified distance, said valve assembly normally being located in said first position.

9. The two-stage shock absorber according to claim 8 wherein said valve assembly comprises a lower valve assembly slidably disposed within said pressure tube, said lower valve assembly providing a first and a second fluid passageway during movement of said valve assembly within said pressure tube, said lower valve assembly engaging said independent ring to close one of said first and second passageways of said lower valve assembly when said valve assembly moves said specified distance in a first direction.

10. The two-stage shock absorber according to claim 9 wherein said closing of said passageway in said lower valve assembly occurs in a continuously variable manner.

11. The two-stage shock absorber according to claim 9 wherein said valve assembly further comprises an upper valve assembly slidably disposed within said pressure tube, said upper valve assembly providing a first and a second passageway during movement of said valve assembly within said pressure tube, said upper valve assembly engaging said independent ring to close one of said first and second passageways of said upper valve assembly when said valve assembly moves said specified distance in a second direction.

12. The two-stage shock absorber according to claim 11 wherein said closing of said passageway in said upper valve assembly occurs in a continuously variable manner.

13. The two-stage shock absorber according to claim 12 wherein said closing of said passageway in said lower valve assembly occurs in a continuously variable manner.

14. The two-stage shock absorber according to claim 9 wherein said valve assembly further comprises a housing which cooperates with said pressure tube to provide a single passageway, said housing engaging said independent ring when said valve assembly moves said specified distance in a second direction.

15. The two-stage shock absorber according to claim 14 wherein said closing of said passageway in said lower valve assembly occurs in a continuously variable manner.

16. A two-stage shock absorber comprising:

a pressure tube;

a valve assembly slidably disposed within said pressure tube, said valve assembly dividing said cylinder into two liquid chambers, said valve assembly comprising:

a lower valve assembly slidably disposed within said pressure tube, said lower valve assembly providing a first and a second passageway through said lower valve assembly;

an upper valve assembly slidably disposed within said pressure tube spaced from said lower valve assembly to define an intermediate chamber, said upper valve assembly providing a first and a second passageway through said upper valve assembly;

a piston rod extending through one of said liquid chambers and projecting out of said pressure tube, said piston rod being connected to said valve assembly;

a ring slidably disposed within said intermediate chamber, said ring being operable to engage said lower valve assembly to close one of said passageways through said lower valve assembly when movement of said valve assembly with respect to said tube exceeds a specified distance in an extension direction, said ring being operable to engage said upper valve assembly to close one of said passageways through said upper valve assembly when movement of said valve assembly with respect to said tube exceeds a specified distance in a compression direction.

17. The two-stage shock absorber according to claim 16 wherein said closing of said passageway in said lower valve assembly occurs in a continuously variable manner.

18. The two-stage shock absorber according to claim 17 wherein said closing of said passageway in said upper valve assembly occurs in a continuously variable manner.

19. The two-stage shock absorber according to claim 16 wherein said closing of said passageway in said upper valve assembly occurs in a continuously variable manner.

20. A two-stage shock absorber comprising:

a pressure tube;

a valve assembly slidably disposed within said pressure tube, said valve assembly dividing said cylinder into two liquid chambers, said valve assembly comprising:

a lower valve assembly slidably disposed within said pressure tube, said lower valve assembly providing a first and a second passageway through said lower valve assembly;

a housing spaced from said lower valve assembly to define an intermediate chamber, said housing and said pressure tube providing a single passageway;

a piston rod extending through one of said liquid chambers and projecting out of said pressure tube, said piston rod being connected to said valve assembly; an independent ring slidably disposed within said intermediate chamber, said valve assembly being movable between a first position, a second position and a third position, said independent ring being spaced from said lower valve assembly and said housing in said first position, said lower valve assembly engaging said independent ring in said second position to close one of said passageways through said lower valve assembly when movement of said valve assembly with respect to said tube exceeds a specified distance in an extension direction, said housing engaging said independent ring in said third position when movement of said valve assembly with respect to said tube exceeds a specified distance in a compression direction.

21. The two-stage shock absorber according to claim 20 wherein said closing of said passageway in said lower valve assembly occurs in a continuously variable manner.

* * * * *